Jan. 12, 1926.  
G. DADSWELL  
1,569,537
SIGNALING DEVICE FOR MOTOR ROAD VEHICLES
Filed Jan. 15, 1925
FIG. 1.
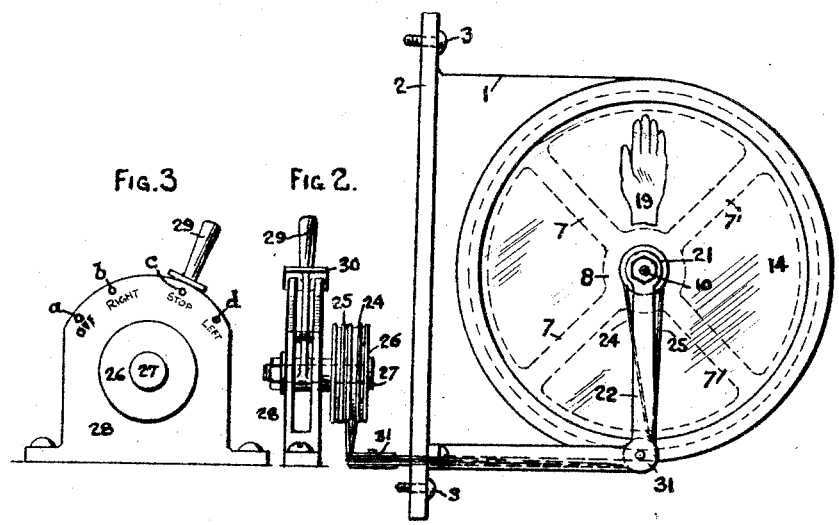
FIG. 3.    FIG. 2.
 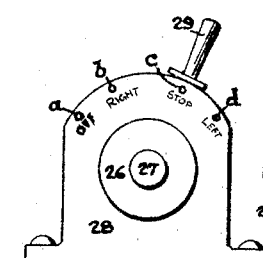
FIG. 5.    FIG. 4.
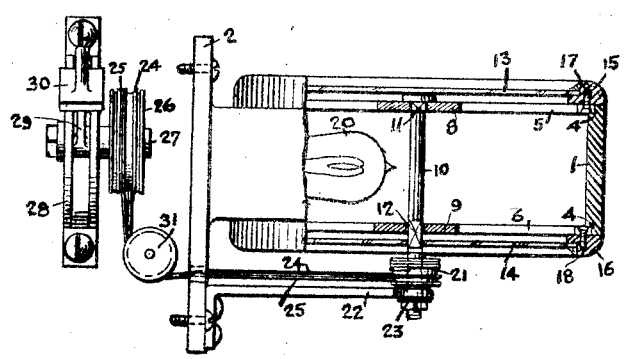
FIG. 6
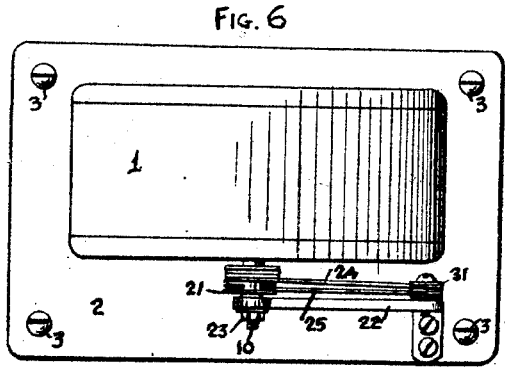
Inventor  
George Dadswell  
by  
B. Singer Atty.

Patented Jan. 12, 1926.

1,569,537

UNITED STATES PATENT OFFICE.

GEORGE DADSWELL, OF ULVERSTON, ENGLAND.

SIGNALING DEVICE FOR MOTOR ROAD VEHICLES.

Application filed January 15, 1925. Serial No. 2,628.

*To all whom it may concern:*

Be it known that I, GEORGE DADSWELL, a subject of the King of Great Britain, residing in Ulverston, county of Lancaster, England, have invented certain new and useful Improvements in and Relating to Signaling Devices for Motor Road Vehicles; and I do hereby declare the following to be a full, clear, and exact description of the invention, such as will enable others skilled in the art to which it appertains to make and use the same.

This invention relates to road-vehicle signals, and deals more particularly with that class of such devices which are designed for and employed in connection with the signification of a driver's intention to stop or turn his motor-vehicle.

My present invention has for its object the production of a simply and cheaply constructed signaling device especially for automobiles possessing advantages in point of efficiency and durability in that when adapted to a motor-vehicle my improved device enables the driver of the same to signal his intention to turn or stop to following colleagues and others by means of apparatus of the type in which circular frames, having each a hand-shaped pointer of coloured glass, are journalled to and rotate around a rigid lamp casing. The circular frames are controlled for simultaneous and uniform actuation from the driver's seat by a hand-lever and quadrant mechanism through steel cables wound around flanged pulleys mounted to shafts on the quadrant mechanism and circular frames respectively.

Another object of my invention is to operate the circular frames having the handshaped pointers by means of a wheel actuating a shaft which in turn is connected through suitable rods and bell-crank levers to a crank mounted to the frame carrying shaft in such manner that a partial rotation in either direction of the hand-wheel corresponds with a similar rotation of the circular frames. A plate, having the words Off, Right, Stop and Left engraved or painted upon its face, indicates the correct position of the pointers.

With the above mentioned and other objects in view, the invention consists in the novel construction and combination of parts hereinafter described, illustrated in the accompanying drawings, and specified in the claim hereto appended; it being understood that various changes in the form, proportion, sizes and minor details of construction within the scope of the claims may be resorted to without departing from the spirit or sacrificing any of the advantages of the invention.

To more fully comprehend the invention reference is directed to the appended drawings forming a part hereof and of which:—

Fig. 1 is a side view in elevation illustrating the device forming the subject matter of my present invention;

Fig. 2 is a rear view in elevation of the operating hand-lever and quadrant mechanism;

Fig. 3 is a vertical side view of the same;

Fig. 4 is a fragmentary transverse section showing the connecting of the circular frames to the operating shaft;

Fig. 5 is a plan view of Figure 2;

Fig. 6 illustrates the outer casing and base plate to fix the apparatus to the vehicle.

Referring more particularly to the several views of the drawings, wherein like numerals of references designate corresponding parts throughout the several views, the device comprises a rigid casing 1 provided with a base plate 2 having four apertures for the reception of screws 3, by means of which the device is rigidly affixed in the required position to the vehicle body. The two faces of the casing 1 are provided with annular recesses 4 into which circular frames 5 and 6 respectively are adapted to rotate. The said frames are provided with four supporting members or arms 7 formed integrally thereon and in the manner shown in Figure 1 or having substantially that configuration. The central portions 8 and 9 of the said frames are provided with square apertures for the accommodation of a shaft 10 of which the portions 11 and 12 are shaped in conformity with the square apertures in the frames 8 and 9, and by means of which the said frames are rotated. Circular glasses 13 and 14 of any desired colour are located in suitable recesses machined in the outside faces of the wooden or other suitable material frames, 15 and 16, which are rigidly affixed to the rotating frames 8 and 9 by means of screws 17 and 18, spaced at equidistant points around the periphery of the said frames. A hand-shaped indicator 19 is, by preference engraved into each glass as shown in Figure 1, but it will be obvious that this indicator may be painted upon or otherwise affixed to, the face of the said glasses. These glasses are illuminated by means of an electric lamp 20 located inside the stationary casing 1.

For the purpose of rotating the shaft 10, and consequently the glass carrying frames, the same is provided at one end with a spirally-grooved pulley 21, keyed or otherwise adjustably mounted thereon, and the outer end of the said shaft is journalled in a suitable bearing formed in a bracket 22, which is secured by means of screws to the base plate 2. The end of the shaft 10 may be screw-threaded to accommodate a locknut 23, in order to prevent any lateral movement of the said shaft. Around the above mentioned pulley the ends of two steel cables or cords 24 and 25 are wound in opposite directions and affixed thereto in such manner that the same are adapted to rotate the pulley in either direction. The other ends of the cables 24 and 25 are similarly affixed to a spirally-grooved pulley 26 of greater diameter than the diameter of the pulley 21. The said pulley 26 is rigidly secured to a shaft 27 revolubly mounted in bearings located in the quadrant 28. A hand-lever 29 is keyed to the said shaft in a manner so as to be located centrally in the quadrant, and is provided with a suitable spring detent 30 which works in conjunction with four stops a, b, c and d upon the said quadrant, and which is located adjacent to the driver's seat of the motor-vehicle. As many suitable loose grooved pulleys 31 are provided as circumstances require to retain the cables 24 and 25 in alignment with the circumference of both spirally-grooved pulleys.

By reference to Figures 1 and 3, it will be seen that the spring detent 30 of the lever 29 is engaging the stop c and that the hand-shaped indicator 19 on the circular glasses is in a vertical position indicating therefore a stoppage of the vehicle. As soon as the lever is moved to engage the stop d the frames are rotated one quarter turn to the left the hand-shaped pointers indicate that the vehicle is intended to be turned to the left. As the lever 29 is moved from stop d to stop b the frames are reversely moved one-half revolution to the effect that the hand-shaped pointers indicate a turning to the right of the vehicle. If the lever is moved from stop b to stop a, which indicates the "off" position, the hand upon the glass frames is pointing downwards, and the contacts of the electric lamp 20 may be so arranged that the current is automatically cut off and that therefore the hand shaped indicator is not visible.

Although I have described the most convenient manner to operate the glass carrying frames it will be obvious that the spirally-grooved actuating pulley may be rotated in one direction by means of a cable and returned to its initial position by means of a spring; also that, instead of a lever a hand-wheel may be provided to operate the device, said hand-wheel being keyed to a shaft having at its outer end a lever pivotally connected to one arm of a bell-crank lever, the other arm of this bell-crank is connected to a cable operating the pulley affixed to the shaft carrying the rotating frames. The various positions of the hand-shaped pointer will in this case be indicated by engraving the respective wording upon a semi-circular plate located underneath the hand-wheel and by providing the said wheel with a pointer or similar device disposed thereon in such manner that the position of the hand-shaped indicator corresponds with the wording of the semi-circular plate.

Having now particularly described my invention, what I claim as new, and desire to secure by Letters Patent is:—

A signaling device of the class described comprising a base plate, a casing thereon, a bracket secured to the base plate and spaced from the front side of the casing, a parallel frame mounted for rotation in the casing and provided with openings, a glass carried by said parallel frame and displaying an indicator before one of said openings, a source of light in said casing and arranged to send light rays throughout the openings of said frame and through said glass, a shaft mounted for rotation in said casing and fixed to said frame and glass, and means to turn said shaft.

In witness whereof I affix my signature.

GEORGE DADSWELL.